UNITED STATES PATENT OFFICE.

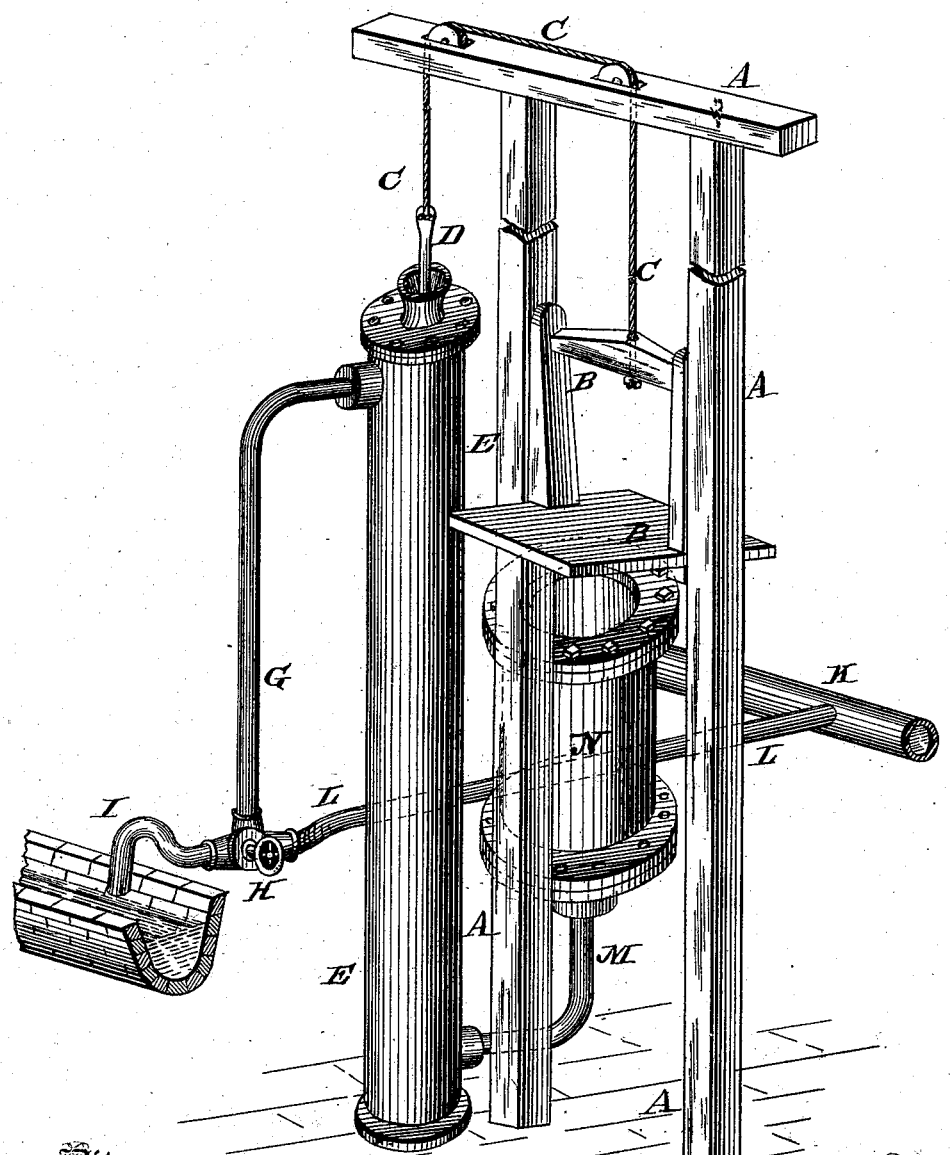

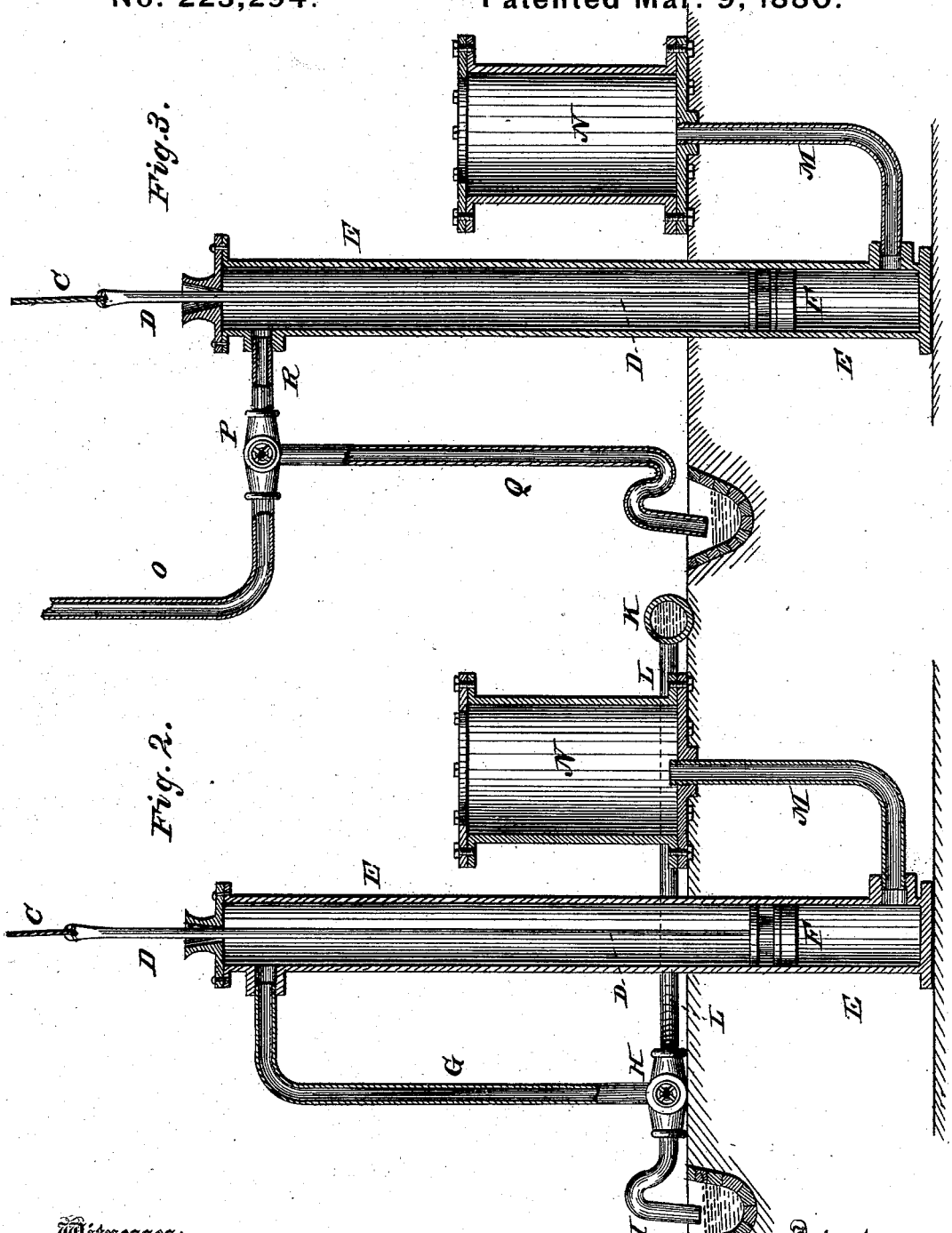

JAMES R. McPHERSON, OF BELOIT, WISCONSIN, ASSIGNOR OF ONE-HALF OF HIS RIGHT TO FRANCIS N. DAVIS, OF SAME PLACE.

HYDRAULIC ELEVATOR.

SPECIFICATION forming part of Letters Patent No. 225,294, dated March 9, 1880.

Application filed January 27, 1880.

*To all whom it may concern:*

Be it known that I, JAMES R. MCPHERSON, of Beloit, in the county of Rock and State of Wisconsin, have invented certain new and useful Improvements in Hydraulic Elevators; and I do hereby declare the following to be a full, clear, and exact description of the invention, such as will enable others skilled in the art to which it pertains to make and use it, reference being had to the accompanying drawings, which form part of this specification.

My invention relates to an improvement in hydraulic elevators.

Heretofore hydraulic elevators have been constructed in such a manner that when the main or lifting cylinder exceeds thirty-three feet in height, or the height to which water will be forced by atmospheric pressure, the column of water in the cylinder in excess of the column of thirty-three feet in height is not counterbalanced by a reacting column of water, but is only displaced by a draft on the head of water employed or the power used to reciprocate the piston in raising the cage.

The object of my invention is to provide a hydraulic apparatus for elevators in which the main or lifting cylinder may be of any desired height, either less or more than thirty-three feet in height, and the liquid in the main cylinder subjected to the counterbalancing influence of independent columns of liquid, one of said columns being equal to or less than thirty-three feet in height and connecting with the discharge-opening, while the other column connects with the lower end of the main cylinder and is provided with a tank at its upper end, the lower column of water, in connection with the supply in the tank, being made to counterbalance the column of water in that portion of the main cylinder that is located below the discharge-opening of the cylinder irrespective of the length of the cylinder, whereby the liquid in the main cylinder is always counterbalanced by the independent columns of liquid, irrespective of the length or height of the main or lifting cylinder; and to this end my invention consists, first, in the combination, with the main or lifting cylinder of a hydraulic elevator, of a discharge-pipe or conduit connecting with the upper end of the cylinder and extending downwardly a distance equal to or less than thirty-three feet, and a pipe connected with the lower end of the main or lifting cylinder and extending upwardly, so that its upper end will be practically in the same horizontal plane with the exit-opening of the discharge-pipe, said lower pipe having a tank connected with its upper end for the reception of water that is forced out of the cylinder when the piston is forced through its downstroke.

My invention further consists in certain other features of construction and arrangement of parts, as will be hereinafter explained, and pointed out in the claims.

In the accompanying drawings, Figure 1 is a view, in perspective, of a hydraulic elevator embodying my improvement. Fig. 2 is a vertical section of the lifting-cylinder and pipes connecting therewith; and Fig. 3 is a modification, representing the arrangement of parts when the water is supplied from a tank located in the upper portion of a building. The tank may be kept supplied with water by any suitable form of pump or forcing apparatus.

A represents the guideways, and B the cage, of an elevator; C, the rope attached to the cage, the rope passing over pulleys located in the top of the elevator-frame or other suitable support, and attached to the upper end of a piston-rod, D.

These several parts may be of ordinary or of any approved construction, as I make no claim to such parts, my invention being applicable to any of the different forms of elevators.

E represents the main or lifting cylinders, which may be of any desired length, and within the same is placed a piston, F, to which is secured one end of the piston-rod D. Hence it will be readily understood that when the piston is forced through its downstroke the elevator cage or car is raised, while the upward stroke of the piston allows of the descent of the car or cage.

G is a discharge-pipe, connecting at its upper end with the upper end of the lifting-cylinder, the lower end extending down equal to or less than thirty-three feet from the top of the lifting-cylinder, where it connects with a valve-casing, H, in which is placed an ordinary three-way valve.

To the valve-casing H is attached a discharge-spout, I, which empties into a sewer or other receptacle for carrying off the discharge-water. K represents the water-main, and L a pipe connecting therewith at one end, while at the opposite end it connects with the valve-casing H.

By turning the three-way valve in one direction the port connecting with the discharge-spout is closed, and the water from the main or under pressure is allowed to flow up through the discharge-pipe G and into the upper end of the main or lifting cylinder and force the piston through its downstroke, and thus operates to raise the elevator-cage.

By turning the three-way valve so as to close both the supply and discharge ports the elevator-cage is securely locked at any point of its travel, and can only descend by adjusting the three-way valve and allowing the water to escape through the discharge-opening.

To the lower end of the main or lifting cylinder is connected a pipe, M, which extends upwardly to such distance that its upper end, $m$, will be practically on the same level as the discharge-opening of the discharge-pipe, while to the upper end of pipe M is secured a water-tank, N.

As the piston in the lifting-cylinder is forced through its downstroke in raising the elevator-cage it operates to displace the water in the lifting-cylinder below the piston and forces the water upwardly through the counterbalancing-pipe M into the tank N. The purpose of the pipe M and tank N is to counterbalance the column of water in the lifting-cylinder located below the level of the discharge-opening of the discharge-pipe. In other words, if the discharge-pipe is thirty-three feet in length, it will serve to counterbalance a column of water equal to thirty-three feet in height in the upper portion of the lifting-cylinder. Now, it is often desirable to employ a lifting-cylinder which will exceed thirty-three feet in height, and hence it is desirable to provide means for counterbalancing the column of water in the lifting-cylinder irrespective of its height, whether it is thirty-three feet or one hundred feet in height, more or less. This I accomplish by providing a separate and independent pipe, M, connecting with the lower end of the lifting-cylinder, and providing the upper end of said pipe with a tank, N, the latter serving as a water-receptacle, and also operating to confine the head of water in pipe M to practically a uniform level.

In Fig. 3 I have represented a modified form of construction, wherein the supply of water is received from a tank, to which water may be supplied by a pump located in the upper portion of the building, instead of being taken directly from the water-main. In this form of construction O represents the supply-pipe, which connects with a valve-casing, P, in which is placed a three-way valve. To the valve-casing P is attached the discharge-pipe Q and branch pipe R.

The lower end of the lifting-cylinder is furnished with a pipe, M, and tank N, constructed and arranged to operate in the manner hereinbefore set forth.

By turning the three-way valve to close the discharge, water is admitted from the pipe O leading to the tank, and conducted to the upper end of the lifting-cylinder, when the pressure serves to force the piston through its downstroke and raise the elevator cage or car. By turning the valve to close the supply and open the discharge the weight of the cage will cause it to descend by gravity.

A hydraulic elevator embodying my improvement is of the most simple and durable construction, and is perfectly safe and certain in its operation.

The cage can be regulated in its descent by simply varying the position of the valve governing the discharge of water from the upper end of the lifting-cylinder, while the maximum effect of the head or pressure of water is insured as the water in the lifting-cylinder is counterbalanced by two independent columns of water acting on opposite ends of the cylinder, and hence the cylinder may be made of any height desired without necessitating any additional or complicated mechanism or power for the perfect and satisfactory operation of the elevator.

It is evident that many slight changes might be resorted to both in details of construction and arrangement of parts without departing from the spirit of my invention, and hence I would have it understood that I do not restrict myself to the exact construction and arrangement of parts shown and described; but, Having fully described my invention, what I claim as new, and desire to secure by Letters Patent, is—

1. In a hydraulic elevator, the combination, with the lifting-cylinder, of a discharge-pipe connecting with the upper end of said cylinder and extending downwardly a distance equal to or less than thirty-three feet, its lower end opening to the atmosphere, and a counterbalance-pipe or water-conduit connected with the lower end of the lifting-cylinder, said pipe extending upward, so that its upper end will be practically on a level with the exit of the discharge-pipe, said counterbalance-pipe having a tank attached to its upper end, substantially as set forth.

2. In a hydraulic elevator, the combination, with the lifting-cylinder, of a discharge-pipe connecting with the upper end of said cylinder, and an independent counterbalance-pipe connecting with the lower end of the lifting-cylinder, said pipes being arranged to counterbalance the column of water in the lifting-cylinder irrespective of its length, substantially as set forth.

3. The combination, with the lifting-cylinder and a combined supply and discharge pipe communicating with the upper end of the lifting-cylinder, said supply and discharge pipe having a three-way valve connected therewith for opening the supply and closing the discharge, or closing the supply and opening the discharge, or closing both the supply and discharge, of an independent counterbalance pipe and tank communicating with the lower end of the lifting-cylinder, and adapted to counterbalance the column of water in the lifting-cylinder located below the exit-opening of the discharge-pipe, substantially as set forth.

4. The combination, with the lifting-cylinder of a hydraulic elevator, of a pipe communicating with one end of said cylinder and serving as a discharge-pipe, and also operating to counterbalance a column of water in the lifting-cylinder equal in height to the length of the discharge-pipe, and a counterbalance-pipe communicating with the opposite end of the lifting-cylinder and operating to counterbalance the remaining column of water in the lifting-cylinder, said lifting-cylinder extending above and below the exit-opening in the discharge-pipe, and the discharge-pipe and counterbalance-pipe being equal in length to that of the lifting-cylinder, substantially as set forth.

In testimony that I claim the foregoing I have hereunto set my hand.

JAMES R. McPHERSON.

Witnesses:
GEO. D. SEYMOUR,
J. W. HAMILTON JOHNSON.